United States Patent
Morris et al.

(10) Patent No.: US 7,093,418 B2
(45) Date of Patent: Aug. 22, 2006

(54) GAS TURBINE ENGINE INCLUDING A LOW PRESSURE SUMP SEAL BUFFER SOURCE AND THERMALLY ISOLATED SUMP

(75) Inventors: Mark C. Morris, Phoenix, AZ (US); Alan G. Tiltman, Fountain Hills, AZ (US); Kin Poon, Tempe, AZ (US); Bradley A. Volkmann, Phoenix, AZ (US)

(73) Assignee: Honeywell International, Inc., Morristown, NJ (US)

( * ) Notice: Subject to any disclaimer, the term of this patent is extended or adjusted under 35 U.S.C. 154(b) by 104 days.

(21) Appl. No.: 10/830,265

(22) Filed: Apr. 21, 2004

(65) Prior Publication Data

US 2005/0235651 A1    Oct. 27, 2005

(51) Int. Cl.
*F02C 7/28* (2006.01)
*F02C 7/06* (2006.01)
*F02G 3/00* (2006.01)

(52) U.S. Cl. .................................... 60/39.08; 184/6.11
(58) Field of Classification Search ............... 60/39.08, 60/39.83; 184/6.11
See application file for complete search history.

(56) References Cited

U.S. PATENT DOCUMENTS

| | | | |
|---|---|---|---|
| 2,614,388 A | 10/1952 | McLeod et al. | |
| 3,133,693 A | 5/1964 | Holl | |
| 3,382,670 A | 5/1968 | Venable | |
| 3,527,054 A | 9/1970 | Hemsworth | |
| 3,844,110 A | 10/1974 | Widlansky et al. | |
| 4,147,026 A | 4/1979 | Weiler | |
| 4,156,342 A * | 5/1979 | Korta et al. | 60/39.08 |
| 4,574,584 A * | 3/1986 | Hovan | 60/782 |
| 4,653,267 A | 3/1987 | Brodell et al. | |
| 4,709,545 A | 12/1987 | Stevens et al. | |
| 5,611,661 A | 3/1997 | Jenkinson | |
| 5,619,850 A | 4/1997 | Palmer et al. | |
| 6,330,790 B1 | 12/2001 | Arora et al. | |
| 6,513,335 B1 * | 2/2003 | Fukutani | 60/785 |
| 6,565,095 B1 * | 5/2003 | Meacham | 277/408 |
| 6,619,030 B1 | 9/2003 | Seda et al. | |
| 6,679,045 B1 * | 1/2004 | Karafillis et al. | 60/39.08 |
| 2003/0011135 A1 * | 1/2003 | Meacham | 277/408 |

FOREIGN PATENT DOCUMENTS

FR    1 291 350 A    4/1962
WO  PCT/US2005013391    12/2005

* cited by examiner

*Primary Examiner*—Ted Kim
(74) *Attorney, Agent, or Firm*—Ingrassia Fisher & Lorenz

(57) ABSTRACT

A gas turbine engine is configured to use relatively cool, low pressure air discharged from a low pressure compressor to supply buffer air to lubrication sump seals. The engine is further configured such that the lubrication sump is thermally layered by isolating relatively hot, high pressure compressor air from the sump by utilizing a warm vent mixing cavity, which is located radially between of the hot high pressure compressor air and the cool buffer air, which is located in a buffer cavity between the vent cavity and the sump.

12 Claims, 3 Drawing Sheets

GAS TURBINE ENGINE INCLUDING A LOW PRESSURE SUMP SEAL BUFFER SOURCE AND THERMALLY ISOLATED SUMP

STATEMENT REGARDING FEDERALLY SPONSORED RESEARCH OR DEVELOPMENT

This invention was made with Government support under Contract No. N00421-02-C-0004 awarded by the U.S. Navy. The Government has certain rights in this invention.

FIELD OF THE INVENTION

The present invention relates to gas turbine engines and, more particularly, to a gas turbine engine that uses low pressure air to buffer one or more sump seals of a bearing sump located between the high pressure compressor and high pressure turbine.

BACKGROUND OF THE INVENTION

A gas turbine engine may be used to power various types of vehicles and systems. A particular type of gas turbine engine that may be used to power aircraft is a multi-spool gas turbine engine. A typical multi-spool gas turbine engine may include, for example, at least three major sections—a compressor section, a combustor section, and a turbine section.

In a multi-spool engine, the compressor section may include two or more compressors. For example, in a dual spool engine, the compressor section may include a high pressure compressor, and a low pressure compressor. No matter the particular number of compressors it includes, the compressor section raises the pressure of the air drawn into the engine to a relatively high level. The compressed air from the compressor section then enters the combustor section, where fuel nozzles inject a steady stream of fuel. The injected fuel is ignited, producing high-energy gas.

The high-energy gas from the combustor section then flows into and through the turbine section, causing rotationally mounted turbine blades to rotate and extract energy. The air exiting the turbine section is exhausted from the engine, and the energy remaining in this exhaust may be used to generate thrust. Similar to the compressor section, in a multi-spool engine the turbine section may include a plurality of turbines. For example, in a dual spool engine, the turbine section may include a high pressure turbine and a low pressure turbine. The energy extracted from each of the turbines may be used to power other portions of the engine. For example, the low pressure turbine may be used to power the low pressure compressor via a low pressure spool, and the high pressure turbine may be used to power the high pressure compressor via a high pressure spool that is concentric to the low pressure turbine spool. The high and low pressure turbines may also be used to power external systems and components.

The gas turbine engine components that are configured to rotate, namely the compressors and turbines, may be rotationally mounted within the engine using bearings. For example, in a multi-spool gas turbine engine, a high pressure spool aft bearing in conjunction with a thrust bearing may be used to rotationally mount the high pressure spool, and thus rotationally support the high pressure compressor and high pressure turbine.

In some gas turbine engines, the high pressure spool aft bearing is located in a sump forward of the high pressure compressor. Thus, the high pressure compressor and high pressure turbine are overhung aft of the high pressure spool aft bearing. This relatively large overhung mass aft of the high pressure spool aft bearing can produce undesirable rotordynamic excursions, which can cause increased turbine clearances, and significantly reduced engine performance. In some other gas turbine engines, the high pressure spool aft bearing is located in a sump between the high pressure compressor and high pressure turbine, which reduces the overhung mass aft of the bearing. As a result, the rotordynamic excursions may be significantly reduced, and turbine clearances and engine performance may improve.

Although the latter engine configuration described above does provide improved engine performance, it does suffer certain drawbacks. For example, the sump seals are buffered using air from either the high pressure compressor impeller inlet or outlet. Because the air in the high pressure compressor is relatively hot, it can thermally stress the sump and sump seals, and/or cause coking of the sump seals, and/or result in undesirable heat input to the lubricant in the sump, and/or undesirable thermal heat rejection from the high pressure compressor air. Moreover, diverting high pressure air from the high pressure compressor can adversely impact engine performance.

Hence, there is a need for a gas turbine engine that is configured with a reduced overhung mass on the high pressure spool aft bearing, and/or that does not rely on air from the high pressure compressor to buffer the bearings of the sump in which the high pressure spool aft bearing is located and/or reduces thermal stresses on the sump and/or seals, and/or improves engine performance. The present invention addresses one or more of these needs.

SUMMARY OF THE INVENTION

The present invention provides a gas turbine engine with a reduced overhung mass on the high pressure spool aft bearing, which uses a low pressure air source to buffer the seals of the sump in which the aft bearing is located.

In one embodiment, and by way of example only, a gas turbine engine includes a housing, a compressor section, a turbine section, a lubrication sump, one or more sump seals, and a buffer air supply conduit. The compressor section and a turbine section are mounted in flow series within the housing. The compressor section includes at least a low pressure compressor and a high pressure compressor, and each compressor has an air inlet and an air outlet. The lubrication sump is disposed between the compressor section and the turbine section, and is adapted to receive a flow of lubricant. The sump seals are coupled to the lubrication sump. The buffer air supply conduit has an inlet in fluid communication with the low pressure compressor air outlet and an outlet in fluid communication with the sump seals, whereby air from the low pressure compressor is used to buffer the sump seals to thereby substantially prevent lubricant from leaking from the lubrication sump.

In another exemplary embodiment, a gas turbine engine includes a low pressure compressor, a high pressure compressor, a combustor, a high pressure turbine, a low pressure turbine, a lubrication sump, one or more sump seals, and a buffer air supply conduit. The low pressure compressor has an air inlet and an air outlet, and is coupled to receive a rotational drive force and is operable, upon receipt thereof, to supply a flow of low pressure compressed air. The high pressure compressor has an air inlet and an air outlet, the high pressure compressed air inlet in fluid communication with the low pressure compressor air outlet, to thereby receive at least a portion of the flow of low pressure compressed air therefrom. The high pressure compressor is coupled to receive a rotational drive force and is operable, upon receipt thereof, to supply a flow of high pressure compressed air. The combustor is coupled to receive at least a portion of the flow of high pressure compressed air and a flow of fuel and is operable to supply a flow of combusted gas. The high pressure turbine is coupled to receive the flow of combusted gas and is operable, upon receipt thereof, to supply the drive force to the high pressure compressor and to supply high pressure turbine exhaust. The low pressure turbine is coupled to receive the high pressure turbine exhaust and is operable, upon receipt thereof, to supply the drive force to the low pressure compressor. The lubrication sump is disposed between the high pressure compressor and the high pressure turbine, and is adapted to receive a flow of lubricant. The sump seals are coupled to the lubrication sump. The buffer air supply conduit has an inlet in fluid communication with the low pressure compressor air outlet and an outlet in fluid communication with the sump seals, whereby a portion of the flow of low pressure compressed air is used to buffer the sump seals to thereby substantially prevent lubricant from leaking from the lubrication sump.

In yet another exemplary embodiment, a method of buffering sump seals in a gas turbine engine including a low pressure compressor having an air inlet and an air outlet, a high pressure compressor, a turbine, and a lubrication sump having one or more sump seals, includes supplying buffer air to the one or more sump seals from the low pressure compressor air outlet, to thereby buffer the sump seals.

In still another exemplary embodiment, a method of thermally isolating a lubrication sump from air discharged from a high pressure compressor in a gas turbine engine that includes a low pressure compressor, the high pressure compressor, a turbine, and the lubrication, includes forming a buffer cavity that at least partially surrounds the lubrication sump, and forming a vent cavity that at least partially surrounds the buffer cavity. One or more vent seals are disposed between the buffer cavity and the vent cavity. The vent seals are configured to allow leakage at least from the buffer cavity to the vent cavity. One or more throttle seals are disposed between the high pressure compressor air outlet and the vent cavity. The throttle seals are configured to at least allow leakage from the high pressure compressor air outlet to the vent cavity. Air is supplied to the buffer cavity from the low pressure compressor air outlet.

Other independent features and advantages of the preferred gas turbine engine and method will become apparent from the following detailed description, taken in conjunction with the accompanying drawings which illustrate, by way of example, the principles of the invention.

DETAILED DESCRIPTION OF A PREFERRED EMBODIMENT

Before proceeding with the detailed description, it is to be appreciated that the following detailed description is merely exemplary in nature and is not intended to limit the invention or the application and uses of the invention. In this regard, it is to be additionally appreciated that the described embodiment is not limited to use in conjunction with a particular type of turbine engine. Hence, although the present embodiment is, for convenience of explanation, depicted and described as being implemented in a multi-spool gas turbine jet engine, it will be appreciated that it can be implemented in various other types of turbines, and in various other systems and environments. Furthermore, there is no intention to be bound by any theory presented in the preceding background or the following detailed description.

Figure 1:
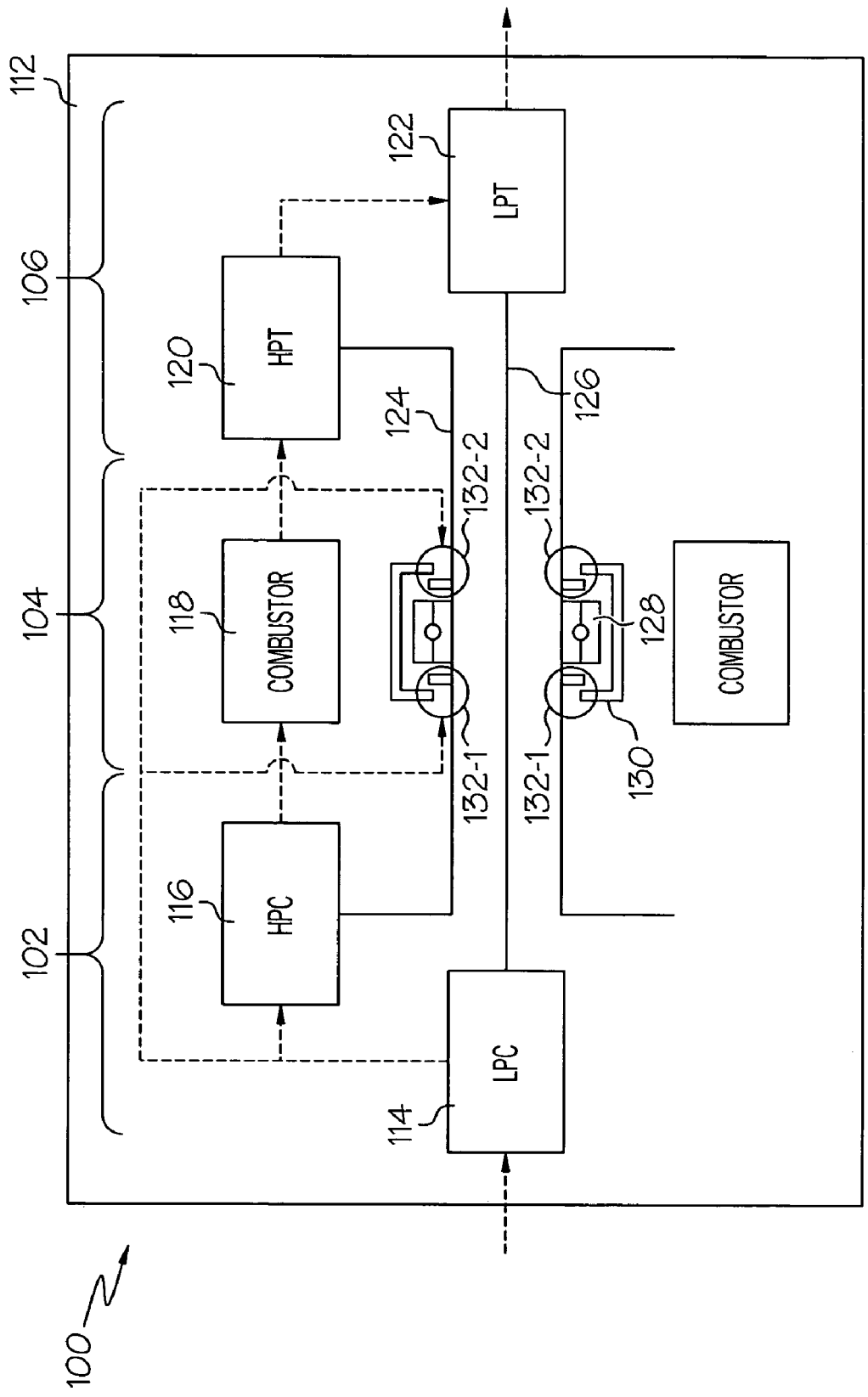
FIG. 1 is a simplified schematic representation of an exemplary gas turbine engine configured to implement an embodiment of the present invention.

A simplified schematic representation of an exemplary embodiment of a dual-spool gas turbine engine 100 is depicted in FIG. 1, and includes a compressor section 102, a combustion section 104, and a turbine section 106, all mounted within a housing 112. The compressor section 102 includes two compressors, a low pressure compressor 114, and a high pressure compressor 116. The low pressure compressor 114 raises the pressure of air drawn into the engine 100, and directs the compressed air into the high pressure compressor 116. The high pressure compressor 116 compresses the air still further, and directs the high pressure compressed air into the combustion section 104.

The combustion section 104 includes a combustor 118, a plurality of non-illustrated fuel injectors, and one or more non-illustrated igniters. A relatively large fraction of the high pressure compressed air from the high pressure compressor 116 is directed into the combustor 118, where it is mixed with fuel supplied to the combustor 118 via the non-illustrated fuel injectors, and combusted to produce a high-energy combustion gas. The high-energy combustion gas is then directed into the turbine section 106.

The turbine section 106 includes two turbines disposed in axial flow series, a high pressure turbine 120, and a low pressure turbine 122. The high-energy combustion gas from the combustion section 104 expands through each turbine 120, 122, causing each to rotate. As the turbines 120, 122 rotate, each drives equipment in the engine 100 via concentrically disposed shafts or spools. Specifically, the high pressure turbine 120 drives the high pressure compressor 116 via a high pressure spool 124, and the low pressure turbine 122 drives the low pressure compressor 114 via a low pressure spool 126.

The turbine engine 100, as is generally known, includes a plurality of bearings that rotationally support the high pressure spool 124, the low pressure spool 126, and various other rotating components within the engine housing 112. Included among these various bearings is a high pressure roller bearing 128, which rotationally supports the high pressure spool 124. It will be appreciated that the engine 100 includes various other bearings; however, for clarity and ease of explanation, only the high pressure roller bearing 128 is explicitly depicted and described herein. The high pressure roller bearing 128 is disposed within a lubrication sump 130 that, as will be described and depicted in more detail below, is located between the high pressure compressor 116 and the high pressure turbine 120.

The lubrication sump 130 receives a flow of lubricant from a non-illustrated lubricant source to lubricate the high pressure roller bearing 128. To prevent the lubricant from leaking from the sump 130 into the air and combusted gas flow paths, the lubrication sump 130 includes one or more sump seals 132. In the depicted embodiment, a forward and an aft sump seal 132-1, 132-2 are included, though it will be appreciated that other numbers of seals could be provided. It will additionally be appreciated that the sump seals 132 may be any one of numerous types of seals including, but not limited to, labyrinth seals, face seals, and ring seals. In a preferred embodiment, however, the sump seals 132 are each a spring-loaded carbon ring seal.

As is generally known, the sump seals 132 are preferably supplied with buffer air. The buffer air maintains a positive differential pressure across the sump seals 132, which further improves the sealing capabilities of the sump seals 132. In the present embodiment, a portion of the air discharged from the low pressure compressor 114 is used to supply buffer air to the sump seals 132. The air discharged from the low pressure compressor 114 is relatively cool compared to that discharged from the high pressure compressor 116. As a result, the sump seals 132, and the sump itself 130, experience reduced levels of thermal stress, and the sump seals 132 are less likely to be coked, thereby significantly reducing the likelihood of lubricant leakage from the sump 130. Moreover, as will be described in more detail further below, the relatively cool buffer air supplied from the low pressure compressor 114 thermally isolates the sump 130 from the relatively high temperature air discharged from the high pressure compressor 116, thereby providing a thermally layered sump 130.

Figure 2:
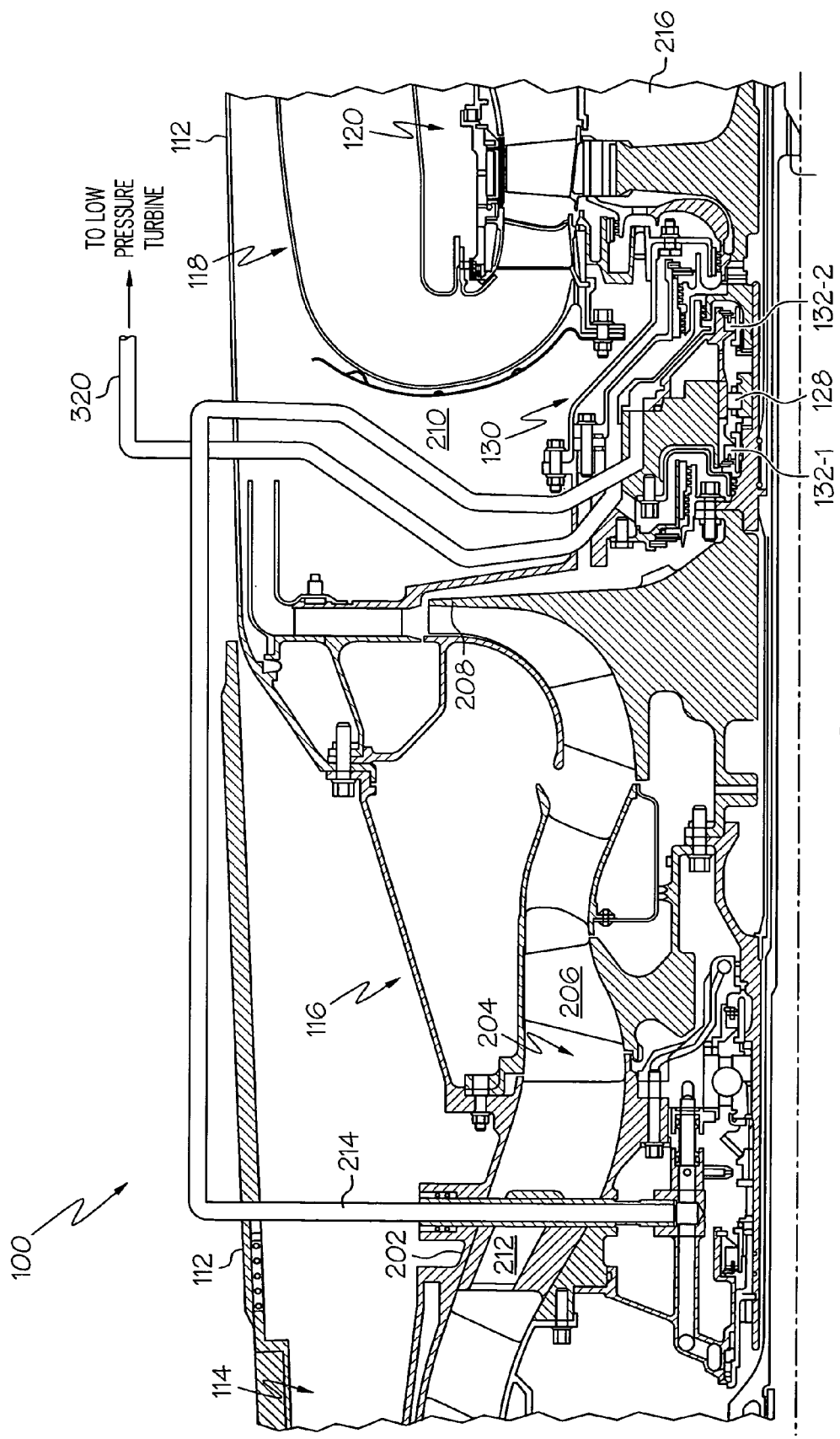
FIG. 2 is a cross section view of a portion of an exemplary physical implementation of the gas turbine engine of FIG. 1.
Figure 3:
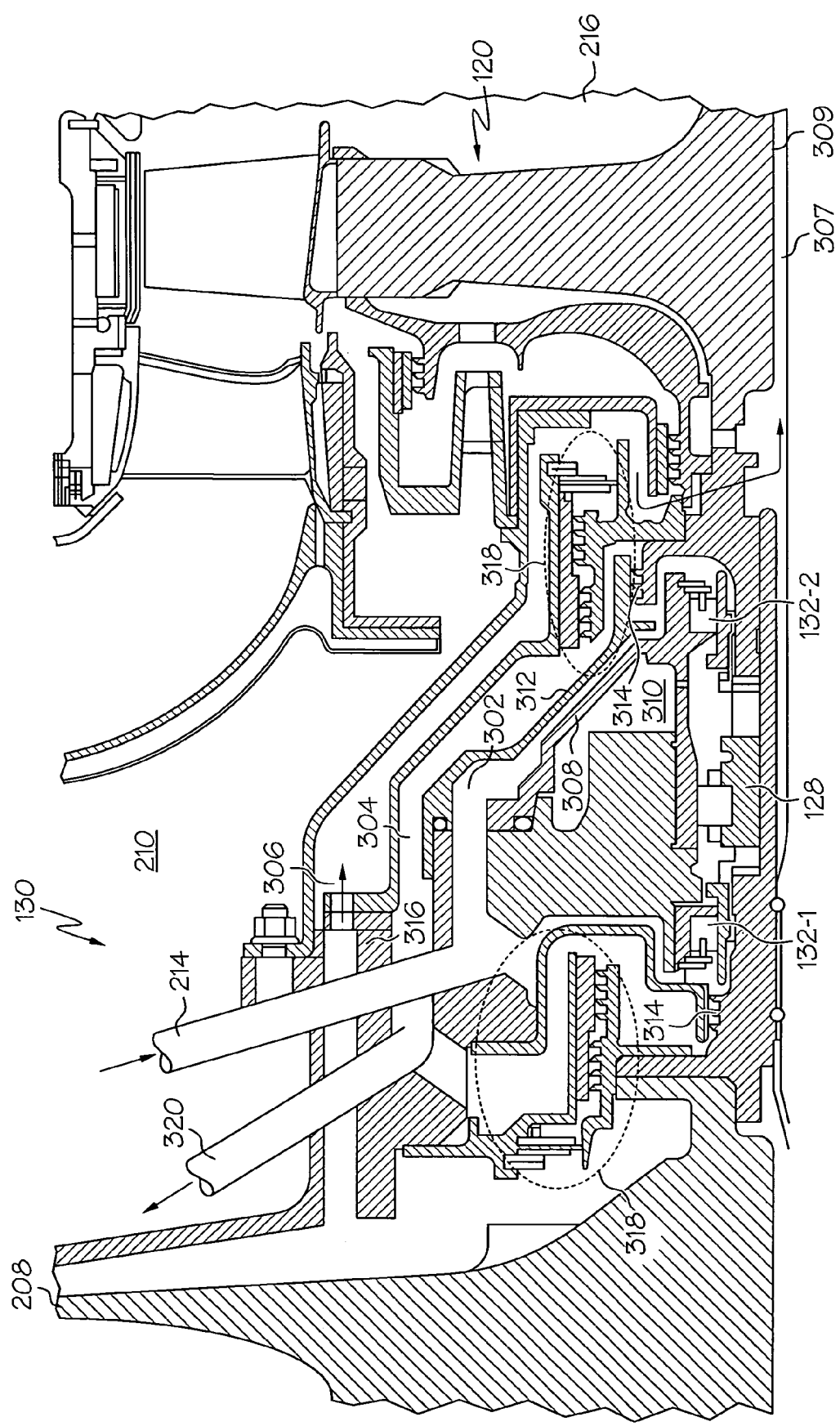
FIG. 3 is a close up cross section view of a portion of the exemplary physical implementation shown in FIG. 2.

It will be appreciated that the gas turbine engine 100 described above, which uses low pressure compressor discharge air to buffer the sump seals 132 and provides a thermally layered sump 130, may be physically implemented using any one of numerous and varied physical configurations. One representative physical implementation is shown in FIGS. 2 and 3, and will now be described. It will be appreciated that in FIGS. 2 and 3 like reference numerals refer to like parts in FIG. 1.

Referring first to FIG. 2, an enlarged cross section view of a portion of the turbine engine 100 described above is shown in more detail. As shown more clearly in FIG. 2, the low pressure compressor 114, which is only partially shown in FIG. 2, includes a plurality of struts 202 (only one shown) that direct the low pressure air around various hardware and other structure that extend through the space envelope of the low pressure compressor 114. After passing around these struts 202, the low pressure compressed air enters an annular duct 204, which directs the air into the high pressure compressor 116.

The high pressure compressor 116 includes a plurality of axial compressor airfoils 206, and an impeller 208, which together further compress the low pressure compressed air discharged from the low pressure compressor 114, to produce high pressure compressed air. The high pressure compressed air is then discharged into a combustor plenum 210 located just upstream of the combustor 118.

As was previously mentioned, a portion of the relatively cool, low pressure air discharged from the low pressure compressor 114 is supplied as buffer air to the sump seals 132. In the depicted embodiment, this is accomplished by drawing a portion of the low pressure air through one or more air scoops 212 formed in the struts 202. The dynamic pressure of the low pressure air is partially recovered upon passage through the air scoops 212, and is routed, via a buffer air supply passage 214, to the sump seals 132 for use as buffer air. In the depicted embodiment, the buffer air supply passage 214 is a conduit that extends out of the engine housing 112 adjacent the low pressure compressor 114, and back into the engine housing 112 adjacent the combustor plenum 210. It will be appreciated, however, that this is merely exemplary of a particular embodiment, and that other configurations could be used. For example, the buffer air supply passage 214 could be configured as one or more cast passages, which could be formed within the housing 112, outside the housing 112, or a combination of both.

No matter the particular structural configuration that is used to implement the buffer air supply passage 214, it will be appreciated that the buffer air provides balanced buffering to both the forward 132-1 and aft 132-2 sump seals. Moreover, and as will now be described in more detail, the relatively cool, low pressure buffer air also thermally isolates the sump 130 from the relatively hot, high pressure air discharged from the high pressure compressor 116 that is used to cool a high pressure turbine rotor aft cavity 216. A preferred physical configuration that is used to implement each of these functions in the gas turbine engine 100 is illustrated in FIG. 3, and will now be described in more detail.

Turning now to FIG. 3, it is seen that the lubrication sump 130 includes a buffer cavity 302, a vent cavity 304, and a high pressure air cavity 306. It will be appreciated that housing 112 may implemented to define the sump 130, and each of the cavities 302, 304, 306, in any one of numerous ways. For example, the housing 112, or at least the section of the housing depicted in FIG. 3, could be cast or machined in such a manner as to define the sump and cavities, or it could be an assembly of various components that do so. Moreover, the particular configuration of the housing 112, sump 130, and cavities 302, 304, 306, may be numerous and varied, and it will be appreciated that the particular configuration shown in FIG. 3 is merely exemplary.

Nonetheless, in the depicted embodiment, it is seen that the sump 130 includes one or more sump walls 308 that define a bearing compartment 310, in which the high pressure roller bearing 128 is located. The buffer cavity 302 at least partially surrounds the sump 130 and is disposed between the sump walls 308 and one or more buffer/vent cavity interface walls 312. One or more vent seals 314 are coupled to the buffer/vent cavity interface walls 312. The vent seals 314 may be any one of numerous types of seals, but in a particular preferred embodiment the vent seals 314 are labyrinth seals, which allow air to flow between the buffer cavity 302 and the vent cavity 304.

The vent cavity 304 at least partially surrounds the buffer cavity 302 and is disposed between the buffer/vent cavity interface walls 312 and one or more vent/high pressure cavity interface walls 316. Similar to the buffer/vent cavity interface walls 312, one or more throttle seals 318 are coupled to the vent/high pressure cavity interface walls 316. The throttle seals 318 may be any one of numerous types of seals, but in a particular preferred embodiment the throttle seals 318 are brush or finger seals in series with labyrinth seals, which allow air to flow between the high pressure cavity 306 and the vent cavity 304. The throttle seals 318 serve to minimize the amount of high pressure discharge air from the impeller 208 backface that may leak into the vent cavity 304.

As was noted above, and is shown more clearly in FIG. 3, the relatively cool, low pressure compressor air that flows into and through the buffer air supply passage 214 is directed into the buffer cavity 302. This relatively cool buffer air not only buffers the sump seals 132, but additionally reduces heat transfer into to the bearing compartment 310. A portion of the high pressure compressor air supplied to the high pressure cavity 306 leaks across throttle seals 318 and, as a result, drops to a pressure that is less than the pressure in the buffer cavity 302. This ensures that the sump seals 132 remain isolated from the relatively hot compressor discharge air that flows radially inward along the backface of the impeller 208, and through the high pressure cavity 306. Another flow passage 307 routes a portion of the high pressure air from the high pressure cavity 306 to the high pressure turbine rotor aft cavity 216, via a bore 309 in the high pressure turbine rotor. This high pressure air is used to cool the high pressure turbine rotor aft cavity 216. Thus, the bearing compartment 310 remains thermally isolated from the relatively hot high pressure compressor discharge air that flows into and through the high pressure cavity 306.

The buffer air supplied to the sump seals 132 leaks from the buffer cavity 302, across the vent seals 314, and into the vent cavity 304. In the vent cavity 304, the cool buffer air mixes with the relatively hot, high pressure compressor air that leaks across the throttle seals 318, producing relatively warm buffer vent air. The warm buffer vent air is directed out of the vent cavity 304, via a buffer vent air passage 320. In the depicted embodiment, and as may be seen with quick reference back to FIG. 2, the buffer vent air passage 320 is implemented as a conduit that extends out of the engine housing 112 via the combustor plenum 210, and back into the engine housing 112 adjacent the low pressure turbine 122, where it supplies the vent air to the low pressure turbine 122. It will be appreciated that the depicted implementation is merely exemplary of a particular embodiment, and that other configurations could be used. For example, the buffer vent supply passage 320 could be configured as one or more cast passages, which could be formed within the housing 112, outside the housing 112, or a combination of both.

The gas turbine engine 100 described uses relatively cool, low pressure air discharged from the low pressure compressor to supply buffer air to the lubrication sump seals. The engine is further configured to implement a thermally layered sump in which relatively hot, high pressure compressor air is isolated from the sump via warm buffer air located in a vent cavity between the high pressure compressor air and the sump, and the cool buffer air located in a cavity between the vent cavity and the sump. The result is a robust configuration which delivers cool buffer air to the sump with improved engine performance.

While the invention has been described with reference to a preferred embodiment, it will be understood by those skilled in the art that various changes may be made and equivalents may be substituted for elements thereof without departing from the scope of the invention. In addition, many modifications may be made to adapt to a particular situation or material to the teachings of the invention without departing from the essential scope thereof. Therefore, it is intended that the invention not be limited to the particular embodiment disclosed as the best mode contemplated for carrying out this invention, but that the invention will include all embodiments falling within the scope of the appended claims.

We claim:

1. A gas turbine engine, comprising:
   a compressor section and a turbine section mounted in flow series, the compressor section including at least a low pressure compressor and a high pressure compressor, each compressor having an air inlet and an air outlet;
   a housing that at least partially surrounds the compressor section and the turbine section, the housing configured to define a lubrication sump, a buffer cavity, a vent cavity, and a high pressure air cavity in fluid communication with the high pressure compressor air outlet and the turbine section;
   a lubrication sump disposed between the compressor section and the turbine section, the lubrication sump adapted to receive a flow of lubricant;
   one or more sump seals coupled to the lubrication sump and at least partially exposed to the buffer cavity;
   one or more vent seals disposed between the buffer cavity and the vent cavity, the vent seals configured to allow fluid flow at least from the buffer cavity to the vent cavity, the vent seals configured to allow fluid flow at least from the buffer cavity to the vent cavity;
   one or more throttle seals disposed between the vent cavity and the high pressure cavity, the throttle seals configured to allow fluid flow at least from the high pressure cavity to the vent cavity; and
   a buffer air supply passage having an inlet in fluid communication with the low pressure compressor air outlet and an outlet in fluid communication with the sump seals, whereby air from the low pressure compressor is used to buffer the sump seals to thereby substantially prevent lubricant from leaking from the lubrication sump.

2. The engine of claim 1, wherein:
   the sump seals comprise ring seals; and
   the vent seals comprise labyrinth seals.

3. The engine of claim 1, wherein:
   the sump seals comprise ring seals; and
   the vent seals comprise labyrinth seals; and
   the throttle seals comprise labyrinth seals in series with either brush seals or finger seals.

4. The engine of claim 1, wherein the housing is configured to define the buffer air supply passage.

5. The engine of claim 1, wherein the buffer air supply passage comprises a tube that extends through at least a portion of the housing.

6. The engine of claim 1, wherein the sump seals comprise ring seals.

7. A gas turbine engine, comprising:
   a low pressure compressor having an air inlet and an air outlet, the low pressure compressor coupled to receive a rotational drive force and operable, upon receipt thereof, to supply a flow of low pressure compressed air;
   a high pressure compressor having an air inlet and an air outlet, the high pressure compressed air inlet in fluid communication with the low pressure compressor air outlet, to thereby receive at least a portion of the flow of low pressure compressed air therefrom, the high pressure compressor coupled to receive a rotational drive force and operable, upon receipt thereof, to supply a flow of high pressure compressed air;
   a combustor coupled to receive at least a portion of the flow of high pressure compressed air and a flow of fuel and operable to supply a flow of combusted gas;
   a high pressure turbine coupled to receive the flow of combusted gas and operable, upon receipt thereof, to supply the drive force to the high pressure compressor and to supply high pressure turbine exhaust;
   a low pressure turbine coupled to receive the high pressure turbine exhaust and operable, upon receipt thereof, to supply the drive force to the low pressure compressor;
   a lubrication sump disposed between the high pressure compressor and the high pressure turbine, the lubrication sump adapted to receive a flow of lubricant;
   a housing that at least partially surrounds the high and low pressure compressors, the high and low pressure turbines, and the combustor, the housing configured to define the lubrication sump, a buffer cavity, a vent cavity, and a high pressure air cavity in fluid communication with the high pressure compressor air outlet and the low pressure turbine;

one or more sump seals coupled to the lubrication sump and at least partially exposed to the buffer cavity;

one or more vent seals disposed between the buffer cavity and the vent cavity, the vent seals configured to allow fluid flow at least from the buffer cavity to the vent cavity;

one or more throttle seals disposed between the vent cavity and the high pressure cavity, the throttle seals configured to allow fluid flow at least from the high pressure cavity to the vent cavity; and a buffer air supply conduit having an inlet in fluid communication with the low pressure compressor air outlet and an outlet in fluid communication with the sump seals and the buffer cavity, whereby a portion of the flow of low pressure compressed air is used to buffer the sump seals to thereby substantially prevent lubricant from leaking from the lubrication sump.

8. The engine of claim 7, wherein:
the sump seals comprise ring seals; and
the vent seals comprise labyrinth seals.

9. The engine of claim 7, wherein:
the sump seals comprise ring seals; and
the vent seals comprise labyrinth seals; and
the throttle seals comprise labyrinth seals and either finger seals or brush seals.

10. The engine of claim 7, wherein the housing is configured to define the buffer air supply conduit.

11. The engine of claim 7, wherein the buffer air supply conduit comprises a tube that extends through at least a portion of the housing.

12. The engine of claim 7, wherein the sump seals comprise ring seals.

* * * * *